(12) United States Patent
Bridges et al.

(10) Patent No.: US 10,044,038 B2
(45) Date of Patent: Aug. 7, 2018

(54) NITRIDE- AND OXIDE-MODIFIED ELECTRODE COMPOSITIONS AND THEIR METHODS OF MAKING

(71) Applicant: UT-BATTELLE, LLC, Oak Ridge, TN (US)

(72) Inventors: Craig A. Bridges, Oak Ridges, TN (US); Mariappan Parans Paranthaman, Knoxville, TN (US); Gabriel M. Veith, Knoxville, TN (US); Zhonghe Bi, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 466 days.

(21) Appl. No.: 14/473,099

(22) Filed: Aug. 29, 2014

(65) Prior Publication Data

US 2015/0064580 A1    Mar. 5, 2015

Related U.S. Application Data

(60) Provisional application No. 61/873,129, filed on Sep. 3, 2013.

(51) Int. Cl.
| | |
|---|---|
| *H01M 4/58* | (2010.01) |
| *H01M 4/36* | (2006.01) |
| *H01M 4/136* | (2010.01) |
| *H01M 10/0525* | (2010.01) |
| *H01M 10/054* | (2010.01) |

(52) U.S. Cl.
CPC ............. *H01M 4/58* (2013.01); *H01M 4/136* (2013.01); *H01M 4/366* (2013.01); *H01M 10/054* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 5,449,577 A | 9/1995 | Dahn et al. | |
| 6,066,414 A * | 5/2000 | Imoto | ................ C01B 21/0821 423/385 |
| 7,678,503 B2 | 3/2010 | Manthiram et al. | |
| 7,718,319 B2 | 5/2010 | Manthiram et al. | |

(Continued)

OTHER PUBLICATIONS

Office Action dated Apr. 26, 2017 in U.S. Appl. No. 13/645,779.

(Continued)

*Primary Examiner* — Alix E Eggerding
(74) *Attorney, Agent, or Firm* — Brinks Gilson & Lione; Jonathan M. Hartley

(57) ABSTRACT

Compositions and methods of making compositions are provided for nitride- and/or oxide-modified electrode compositions. In certain embodiments, the nitride- and/or oxide-modified compositions have the general formula $M_{1-z}M'_zO_aF_{3-x}N_y$. Such compositions may be used as bulk or surface compositions, and used in a battery as the anode or cathode. In other embodiments, the electrode includes a surface coating composition selected from metal nitrides and metal oxides, and a core composition having the formula $M_{1-z}M'_zO_aF_{3-x}$, or an oxide fluoride.

18 Claims, 9 Drawing Sheets

(56) References Cited

U.S. PATENT DOCUMENTS

| | | |
|---|---|---|
| 7,986,509 B2 | 7/2011 | Seymour |
| 2004/0229124 A1 | 11/2004 | Miyamoto et al. |
| 2005/0281727 A1* | 12/2005 | Yoshizawa .......... C01B 21/0821 |
| | | 423/385 |
| 2007/0212615 A1 | 9/2007 | Jost et al. |
| 2008/0168865 A1 | 7/2008 | Zhang et al. |
| 2009/0081102 A1 | 3/2009 | Dai et al. |
| 2009/0111024 A1 | 4/2009 | Wurm et al. |
| 2010/0243964 A1* | 9/2010 | Lee .................... H01B 1/02 |
| | | 252/503 |
| 2010/0279117 A1 | 11/2010 | Gu |
| 2011/0165457 A1 | 7/2011 | Prochazka et al. |
| 2011/0281157 A1 | 11/2011 | Seymour |
| 2011/0281174 A1 | 11/2011 | Seymour |
| 2011/0281176 A1 | 11/2011 | Seymour |
| 2011/0281719 A1 | 11/2011 | Liu et al. |
| 2012/0049126 A1 | 3/2012 | Park et al. |
| 2012/0189915 A1* | 7/2012 | Cho .................... H01M 4/136 |
| | | 429/215 |
| 2012/0219859 A1* | 8/2012 | Doe .................... C01B 25/372 |
| | | 429/219 |
| 2012/0282522 A1 | 11/2012 | Axelbaum et al. |
| 2013/0078518 A1 | 3/2013 | Thackeray et al. |
| 2013/0108920 A1 | 5/2013 | Oladeji |
| 2013/0209897 A1 | 8/2013 | Paranthaman et al. |
| 2014/0099547 A1 | 4/2014 | Parans Paranthaman et al. |
| 2014/0099559 A1 | 4/2014 | Parans Paranthaman et al. |
| 2014/0272584 A1* | 9/2014 | Jiang .................... H01M 4/58 |
| | | 429/220 |
| 2017/0098819 A9* | 4/2017 | Loveness ............... H01M 4/13 |

OTHER PUBLICATIONS

Zhao, Liang et al., "Porous $Li_4Ti_5O_{12}$ Coated with N-Doped Carbon from Ionic Liquids for Li-Ion Batteries," Adv. Matter, vol. 23, 2011, pp. 1385-1388.

Murugan, A. Vadivel et al., "One-Pot Microwave-Hydrothermal Synthesis and Characterization of Carbon-Coated $LiMPO_4$ (M=Mn, Fe, and Co) Cathodes", Nov. 25, 2008, Journal of the Electrochemical Society, 156 (2) A79-A83 (2009).

* cited by examiner

US 10,044,038 B2

NITRIDE- AND OXIDE-MODIFIED ELECTRODE COMPOSITIONS AND THEIR METHODS OF MAKING

CROSS-REFERENCE TO RELATED APPLICATIONS

The present application claims priority to U.S. Provisional Patent Application No. 61/873,129, titled NITRIDE- AND OXIDE-MODIFIED ELECTRODE COMPOSITIONS AND THEIR METHODS OF MAKING, filed Sep. 3, 2013, the entire contents of which are hereby incorporated into the present application by reference.

STATEMENT OF GOVERNMENT INTEREST

The invention was made with government support under contract number DE-AC05-00OR22725 by the Department of Energy. The Government has certain rights in the invention.

BACKGROUND

Advanced energy storage systems such as lithium-ion batteries are important approaches to mitigate energy shortage and global climate warming issues that the world is currently facing. High power and high energy density are essential to batteries for applications in electric vehicles, stationary energy storage systems for solar and wind energy, as well as smart grids. Because conventional lithium-ion batteries are inadequate to meet these needs, there is an urgent need for new electrochemical cell chemistries to achieve increased electrical energy storage capacity and rate capability for future energy storage needs. Yet, few viable new electrode materials have emerged. A highly attractive approach is to utilize a redox couple involving multiple oxidation states of the electrode material, as has been demonstrated in metal fluoride conversion electrodes (e.g., $FeF_3$). The ionic nature of the metal-fluoride bond results in a high reaction potential (EMF) when coupled with lithium, which in combination with the ability to access all energetically favorable transition metal oxidation states (e.g. $Fe^{3+}$ to) $Fe^0$, leads to a large theoretical capacity for lithium ion batteries. However, use of metal fluoride materials has been hindered in the past by irreversibility in the conversion reaction and poor conductivity. These problems are linked with poor conductivity, and only a very small current can be used to obtain a large reversible capacity.

Studies have shown that small separation distances between the LiF/metal products formed during cycling of metal fluorides (i.e., a nanocomposite) can promote a reversible reaction. The formation of nanocomposites provided the first breakthrough in achieving a cyclable lithium ion battery with metal fluoride electrodes. In general, approaches that have been used to improve reversible capacity of conversion electrode include: (1) forming a nanocomposite with carbon to improve electrical contact; (2) coating with oxides to control the interface between the electrode and electrolyte (a "mixed conducting matrix", or MOM); and (3) formation of an architecturally controlled, crystalline mesoporous electrode to lower $Li^+$ diffusion distances. Similar approaches have been used to improve the electrochemical performance of the intensively studied cathode $LiFePO_4$, which was not considered technologically relevant as a pure micron-sized powder. In that case, a combination of decreased particle size and coating with electronically conducting agents has been used overcome electronic and ionic transport limitations. Furthermore, very high rate performance has been reported in $LiFePO_4$ through coating with a fast ion conducting $Li_4P_2O_7$-like phase. The $Li_4P_2O_7$-like phase likely aids in the rapid delivery of lithium to surface sites on the $LiFePO_4$ particles. However, the practical capacity of $LiFePO_4$ is ~150 mAh/g, as compared to reported capacities for $FeF_3$ in the range of ~270-600 mAh/g. The major limitation for metal fluoride conversion electrodes has thus far been an inability to couple high capacity with a high rate capability and cycle life (reversibility). Oxide based modification to form FeOF has been shown to improve the reversible capacity of $FeF_3$ over many battery cycles, but does not sufficiently improve the conductivity to obtain a high rate capability.

Therefore, it remains highly desirable to develop an electrode with improved conductivity, improved capacity retention with high rate capability, and improved cycle life.

SUMMARY

Compositions and methods of making are disclosed for nitride- and oxide-modified electrode compositions for use in batteries.

In one embodiment, an electrode for the battery comprises a nitride- or oxide-modified composition having the following formula: $M_{1-z}M'_zO_aF_{3-x}N_y$, wherein: $0 \le z \le 1$; $-3 \le x < 0$ or $0 < x \le 3$; $0 \le a \le 1.5$; $y > 0$; M is selected from the group consisting of: Ti, V, Cr, Mn, Fe, Co, Ni, Cu, and Bi; and M' is selected from the group consisting of: Na, Mg, Al, Si, P, K, Ca, Sc, Ti, V, Cr, Mn, Fe, Co, Ni, Cu, Zn, Ga, Ge, As, Rb, Sr, Y, Zr, Nb, Mo, Tc, Ru, Rh, Pd, Ag, Cd, In, Sn, Sb, Te, Cs, Ba, Hf, Ta, W, Re, Os, Ir, Pt, Au, Tl, Pb, and Bi.

In another embodiment, an electrode composition comprises a surface coating composition selected from the group consisting of metal nitrides and metal oxides. The composition further comprises a core composition having the formula $M_{1-z}M'_zO_aF_{3-x}$, wherein: $0 \le a \le 1.5$; $0 \le z \le 1$; $-3 \le x < 0$ or $0 < x \le 3$; M is selected from the group consisting of: Ti, V, Cr, Mn, Fe, Co, Ni, Cu, and Bi; and M' is selected from the group consisting of: Na, Mg, Al, Si, P, K, Ca, Sc, Ti, V, Cr, Mn, Fe, Co, Ni, Cu, Zn, Ga, Ge, As, Rb, Sr, Y, Zr, Nb, Mo, Tc, Ru, Rh, Pd, Ag, Cd, In, Sn, Sb, Te, Cs, Ba, Hf, Ta, W, Re, Os, Ir, Pt, Au, Tl, Pb, and Bi.

In one other embodiment, an electrode composition comprises a surface coating composition selected from the group consisting of metal nitrides, wherein the metal is selected from the group consisting of: Na, Mg, Al, Si, P, K, Ca, Sc, Ti, V, Cr, Mn, Fe, Co, Ni, Cu, Zn, Ga, Ge, As, Rb, Sr, Y, Zr, Nb, Mo, Tc, Ru, Rh, Pd, Ag, Cd, In, Sn, Sb, Te, Cs, Ba, Hf, Ta, W, Re, Os, Ir, Pt, Au, Tl, Pb, and Bi. The electrode composition further comprises a core composition comprising an oxide fluoride.

In yet another embodiment, a battery composition comprises an anode, a cathode, and an electrolyte capable of supporting reversible deposition and stripping of metal at the anode, and reversible intercalation and deintercalation of the metal at the cathode, wherein either the anode or the cathode comprises a nitride- or oxide-modified composition.

In another embodiment, a method of making a nitride- or oxide-modified electrode composition comprises providing a $M_{1-z}M'_zF_{3-x}$ precursor composition wherein: $0 \le z \le 1$; and $-3 \le x < 0$ or $0 < x \le 3$; M is selected from the group consisting of: Ti, V, Cr, Mn, Fe, Co, Ni, Cu, and Bi, and M' is selected from the group consisting of: Na, Mg, Al, Si, P, K, Ca, Sc, Ti, V, Cr, Mn, Fe, Co, Ni, Cu, Zn, Ga, Ge, As, Rb, Sr, Y, Zr, Nb, Mo, Tc, Ru, Rh, Pd, Ag, Cd, In, Sn, Sb, Te, Cs, Ba, Hf, Ta, W, Re, Os, Ir, Pt, Au, Tl, Pb, and Bi. The method further comprises nitrogen-doping and, optionally, oxidizing the composition to form a modified electrode composition $M_{1-z}M'_zO_aF_{3-x}N_y$, wherein $0 \le a \le 1.5$ and $y > 0$. The method further comprises annealing the modified electrode composition with ammonia gas.

In yet another embodiment, a method of making a nitride- or oxide-modified electrode composition comprises providing a $M_{1-z}M'_zF_{3-x}$ core composition wherein: $0 \le z \le 1$; and $-3 \le x < 0$ or $0 < x \le 3$; M is selected from the group consisting of: Ti, V, Cr, Mn, Fe, Co, Ni, Cu, and Bi, and M' is selected from the group consisting of: Na, Mg, Al, Si, P, K, Ca, Sc, Ti, V, Cr, Mn, Fe, Co, Ni, Cu, Zn, Ga, Ge, As, Rb, Sr, Y, Zr, Nb, Mo, Tc, Ru, Rh, Pd, Ag, Cd, In, Sn, Sb, Te, Cs, Ba, Hf, Ta, W, Re, Os, Ir, Pt, Au, Tl, Pb, and Bi. The method further comprises providing a surface coating composition selected from the group consisting of metal nitrides and metal oxides. The method further comprises coating the core composition with the surface composition to form a modified electrode composition.

DETAILED DESCRIPTION

Figure 1A:
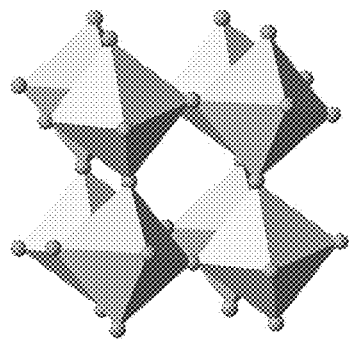
FIGS. 1(A)-(C) depict structures for nitride-based modification of ternary $M_{1-z}M'_zF_3$.

As used herein, the singular forms "a," "an," and "the" include plural referents unless the context clearly dictates otherwise. For example, reference to "a substituent" encompasses a single substituent as well as two or more substituents, and the like.

As used herein, the terms "for example," "for instance," "such as," or "including" are meant to introduce examples that further clarify more general subject matter. Unless otherwise specified, these examples are provided only as an aid for understanding the applications illustrated in the present disclosure, and are not meant to be limiting in any fashion.

As used herein, the following terms have the following meanings unless expressly stated to the contrary. It is understood that any term in the singular may include its plural counterpart and vice versa.

As used herein, the term "lithium-ion" may refer to any ion comprising lithium, including but not limited to $Li^+$.

As used herein, the term "sodium-ion" may refer to any ion comprising sodium, including but not limited to $Na^+$.

As used herein, the term "cycle" may refer to the discharge and charge of the capacity of the battery.

As used herein, the term "functional discharge capacity" may refer to a comparison between the current capacity of the battery versus the battery's initial capacity. In certain embodiments, the battery is still operable when the functional discharge capacity is more than 50%, 60%, 70%, 80%, or 90% of the initial discharge capacity.

As used herein, the terms "secondary" and "secondary battery" may refer to rechargeable batteries wherein the electrochemical reactions are electrically reversible (i.e., the reaction can be reversed by running a current into the cell to restore the capacity of the battery). In certain embodiments, the secondary battery can achieve a number of cycles (e.g., 100, 1000, 5000, or 10000 cycles) while maintaining a functional discharge capacity (e.g., the discharge capacity is more than 50%, 60%, 70%, 80%, or 90% of the initial discharge capacity).

As used here, the terms "C/10," "C/2," "1 C," "2 C," "5 C," "10 C," "20 C," "30 C," "60 C," and the like refer to the "C-rate" or capacity rating (Amp-hour) of the battery.

As used herein, the terms "mesoporous" and "mesoporous structure" may refer to a material or composition containing pores. In certain embodiments, the average pore size of the microsphere structure is between 1 nanometer (nm) and 50 nm. In other embodiments, the average pore diameter in the microsphere structure is between 5 nm and 20 nm. In yet other embodiments, the average pore diameter is between 10 nm and 15 nm. In one particular embodiment, the average pore diameter in the microsphere structure is approximately 12 nm.

It has been discovered that nitride- and/or oxide-modified electrode compositions are capable of enhanced conductivity, improved capacity retention with high rate capability, and improved cycle life in comparison to the current battery technology. In certain embodiments, batteries with nitride- and/or oxide-modified electrode compositions may be used in grid storage applications, vehicle battery applications, military applications, portable electronic device applications, medical device applications, or standard cell size battery applications. In one particular embodiment, a battery with a nitride- and/or oxide-modified electrode composition is used for a grid storage application. In another particular embodiment, the battery is used in a vehicle battery application. In yet another particular embodiment, the battery is used in a portable electronic device application.

In certain embodiments, the improved battery comprises: (1) an anode, (2) cathode, and (3) an electrolyte capable of supporting reversible deposition and stripping of metal at the anode, and reversible intercalation and deintercalation of the metal at the cathode, wherein the anode or cathode comprises a nitride- and/or oxide-modified composition. In some embodiments, the anode comprises the n nitride- and/or oxide-modified composition. In other embodiments, the cathode comprises the nitride- and/or oxide-modified composition.

In certain embodiments, the nitride- and/or oxide-modified electrode is used in one of the following types of batteries: lithium-ion battery, aluminum-ion battery, magnesium-ion battery, sodium-ion battery, metal-air (wherein the metal is lithium, aluminum, magnesium, zinc, or sodium) battery, and metal-sulfur (wherein the metal is lithium, aluminum, magnesium, zinc, or sodium) battery. In one particular embodiment, the nitride-modified electrode is used in a lithium-ion battery. In another embodiment, the nitride-modified electrode is used in a sodium-ion battery.

Nitride- and/or Oxide-Modified Electrodes:

The nitride- and/or oxide-modified electrode may comprise an active material capable of intercalating the metal ions during a discharge cycle and deintercalating the metal ions during a charge cycle. The electrode may be a "high rate" or "high current rate" electrode, and may be capable of a fast charge and discharge capacity.

In certain embodiments, the active components in the nitride- or oxide-modified electrode may be mixed with a carbon material (such as carbon black, for example) to make them conducting, and mixed with a binder (such as PVDF binder in N-methylpyrrolidinole, for example) to hold the material together. In some embodiments, the active nitride- or oxide-modified composition is mixed with carbon black (e.g., Super C45) and polyvinylidene fluoride (PVDF). In some embodiments, the weight ratio of active material (i.e., the nitride- or oxide-modified composition) to carbon black to PVDF is approximately 1:1:1, 2:1:1, 4:1:1, 6:1:1, 8:1:1, or 10:1:1.

Figure 1B:
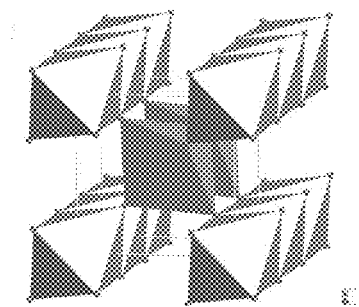
Figure 1C:
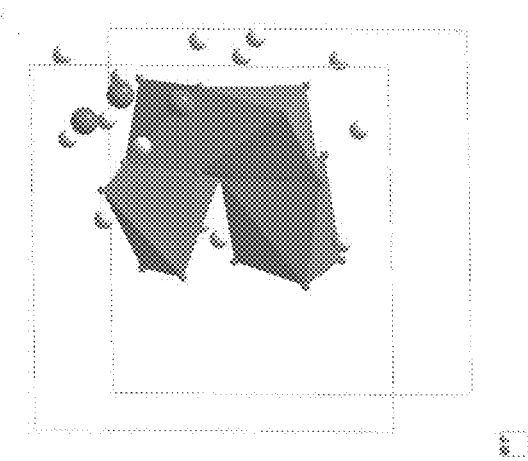

In certain embodiments, the electrode composition may comprise structural patterns such as $ReO_3$-type structures (e.g., $M_{1-z}M'_zF_3$), nitride-doped rutile-type structures ($MF_2$), or bixbyite-type $M_4F_{3+y}N_{3-x}$, or mixtures thereof, as shown in FIGS. 1A, 1B, and 1C. The structural patterns may be varied based on the level of nitride doping and annealing conditions.

Figures 2A, 2B, 2C:
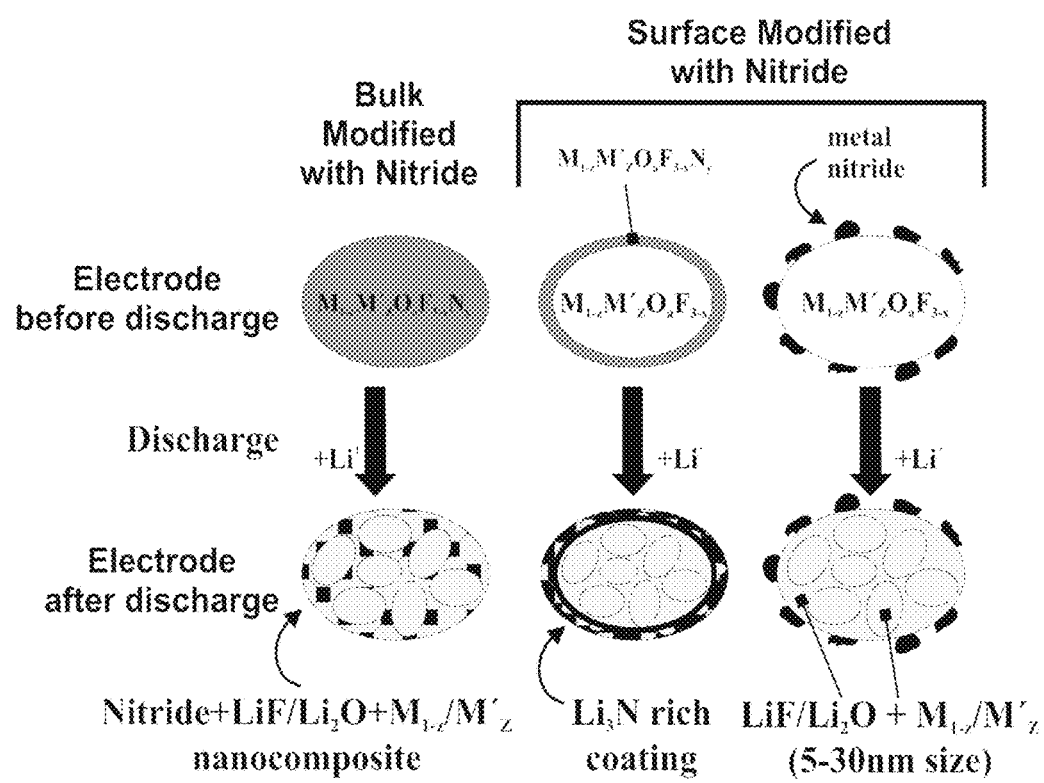
FIGS. 2(A)-(C) depict nitride- and oxide-based modification techniques for $M_{1-z}M'_zO_aF_{3-x}$ electrodes.

Modified Bulk and Surface Compositions:

In certain embodiments, the modified electrode comprises a bulk composition or surface coating composition, as depicted in FIGS. 2(A)-(C), for example. In some embodiments, the modified electrode is a bulk composition, wherein the nitride- and/or oxide-modified electrode composition is present in both the core (and potentially the surface) of the electrode composition (e.g., FIG. 2(A)). In other embodiments, the modified electrode is a surface coating composition, wherein the modification primarily exists on or near the surface of the electrode. For example, the surface coating composition may comprise a core composition (e.g., a metal fluoride composition) that is coated or covered with a nitride- and/or oxide-modified electrode composition (e.g., FIG. 2(B)).

In certain embodiments, the bulk or surface coating composition comprises a nitride- and/or oxide-modified composition having the following general formula: $M_{1-z}M'_zO_aF_{3-x}N_y$, wherein $0 \leq z < 1$, $-3 \leq x < 0$ or $0 < x \leq 3$, $0 \leq a \leq 1.5$, and $y > 0$. In other embodiments, the electrode composition comprises a nitride- and/or oxide-modified composition having the following general formula: $M_{1-z}M'_zO_aF_{3-x}N_y$, wherein $0 \leq z \leq 1$, $0 < x \leq 3$, $0 \leq a \leq 1.5$, and $y > 0$.

M may be a metal selected from the following group consisting of: Ti, V, Cr, Mn, Fe, Co, Ni, Cu, and Bi. M' may be an alkali metal, alkaline earth metal, transition metal, post-transition metal, or metalloid. In some embodiments, M' is selected from the group consisting of: Na, Mg, Al, Si, P, K, Ca, Sc, Ti, V, Cr, Mn, Fe, Co, Ni, Cu, Zn, Ga, Ge, As, Rb, Sr, Y, Zr, Nb, Mo, Tc, Ru, Rh, Pd, Ag, Cd, In, Sn, Sb, Te, Cs, Ba, Hf, Ta, W, Re, Os, Ir, Pt, Au, Tl, Pb, and Bi.

In certain embodiments, a=0 and $0 < x < 3$, and the bulk or surface coating electrode composition comprises a nitride-modified metal fluoride composition. In another embodiment, x=3 and the modified electrode composition has replaced the fluoride with oxide. In yet other embodiments, the modified electrode composition comprises only one metal, M (i.e., z=0). In one particular embodiment, z=0 and M is Fe. In other embodiments, the nitride-modified composition comprises two metal fluoride compositions that are mixed together (e.g., $MF_3$ and $M'F_3$).

In one embodiment, M is Fe. In some embodiments, M is Fe and z=0. In one particular embodiment, the nitride-modified metal fluoride composition is $FeF_{3-x}N_y$.

Alternative Modified Surface Composition:

In certain embodiments, the modified electrode is a surface coating electrode composition, wherein a core composition (e.g., a metal fluoride or oxide fluoride) is coated or covered with a conducting metal nitride or metal oxide composition (e.g., FIG. 2(C)). In certain embodiments, the core electrode composition has the general formula $M_{1-z}M'_zO_aF_{3-x}$, wherein $0 \leq a \leq 1.5$, $0 \leq z \leq 1$, and $-3 \leq x < 0$ or $0 < x \leq 3$. In certain embodiments, the core electrode composition is a metal fluoride composition having the general formula: $M_{1-z}M'_zF_3$, wherein $0 \leq z \leq 1$. In some embodiments, z=0. In other embodiments, z=1. M may be a metal selected from the following group consisting of: Ti, V, Cr, Mn, Fe, Co, Ni, Cu, and Bi. M' may be an alkali metal, alkaline earth metal, transition metal, post-transition metal, or metalloid. In some embodiments, M' is selected from the group consisting of: Na, Mg, Al, Si, P, K, Ca, Sc, Ti, V, Cr, Mn, Fe, Co, Ni, Cu, Zn, Ga, Ge, As, Rb, Sr, Y, Zr, Nb, Mo, Tc, Ru, Rh, Pd, Ag, Cd, In, Sn, Sb, Te, Cs, Ba, Hf, Ta, W, Re, Os, Ir, Pt, Au, Tl, Pb, and Bi.

In other embodiments, the core electrode composition is an oxide fluoride, combined with a surface composition may be a conducting metal nitride composition. In some embodiments, the metal in the metal nitride composition is selected from the group consisting of: Na, Mg, Al, Si, P, K, Ca, Sc, Ti, V, Cr, Mn, Fe, Co, Ni, Cu, Zn, Ga, Ge, As, Rb, Sr, Y, Zr, Nb, Mo, Tc, Ru, Rh, Pd, Ag, Cd, In, Sn, Sb, Te, Cs, Ba, Hf, Ta, W, Re, Os, Ir, Pt, Au, Tl, Pb, Bi, and combinations thereof. In other embodiments, the metal is selected from the group consisting of Ti, V, Cr, Mn, Fe, Co, Ni, Cu, Bi, and combinations thereof.

The surface composition may be a conducting metal nitride composition with the general formula: $M_{1-z}M'_zN_y$, wherein $0 \leq z \leq 1$ and $y > 0$. In some embodiments, z=0. In other embodiments, z=1. M and M' may be selected from the elements or types of metals discussed above.

In other embodiments, the surface composition may be a conducting metal oxide composition with the general formula: $M_{1-z}M'_zO_y$, wherein $0 \leq z \leq 1$ and $y > 0$. In some embodiments, z=0. In other embodiments, z=1. M and M' may be selected from the elements or types of metals discussed above.

Anode Compositions Opposite a Nitride- and/or Oxide-Modified Cathode:

If the modified electrode composition is used as the cathode material in the battery, the anode or counter-electrode material may comprise a core composition having an active material capable of intercalating metal ions during a charge cycle and deintercalating metal ions during a discharge cycle. In certain embodiments, the anode comprises lithium metal or a lithium alloy. In some embodiments, the lithium is alloyed with aluminum. In some embodiments, the anode comprises at least 80 wt. %, 90 wt. %, or 95 wt. % lithium as the primary electrochemically active material.

In some embodiments, the anode comprises sodium metal or a sodium alloy. In some embodiments, the anode comprises at least 80 wt. %, 90 wt. %, or 95 wt. % sodium as the primary electrochemically active material.

In other embodiments, the anode comprises carbon or graphite. In some embodiments, the anode comprises at least 80 wt. %, 90 wt. %, or 95 wt. % carbon or graphite as the primary electrochemically active material.

In yet other embodiments, the anode composition comprises mesoporous metal oxide microspheres, such as those described in U.S. patent application Ser. Nos. 13/372,795, 13/645,779, and 13/645,959, all of which are incorporated by reference herein. In some embodiments, the metal oxide is a transition metal oxide selected from the group consisting of titanium oxides (e.g., titanium dioxide and its polymorphs), vanadium oxides, chromium oxides, manganese oxides, iron oxides, cobalt oxides, nickel oxides, copper oxides, zinc oxides, niobium oxides, tantalum oxides, molybdenum oxides, tungsten oxides, ruthenium oxides, palladium oxides, cadmium oxides, zirconium oxides, hafnium oxides, and combinations thereof. In one particular embodiment, the metal oxide is a titanium oxide.

In some embodiments, the average microsphere diameter is between 200 nm and 10 µm. In other embodiments, the average metal oxide microsphere diameter is between 500 nm and 5 µm. In yet other embodiments, the average microsphere diameter is between 1 µm and 2 µm. In one particular embodiment, the average microsphere diameter is approximately 1 µm.

In certain embodiments, the mesopores in the microsphere structure have an average pore diameter between 1 nm and 50 nm. In other embodiments, the average pore diameter in the microsphere structure is between 5 nm and 20 nm. In yet other embodiments, the average pore diameter is between 10 nm and 15 nm. In one particular embodiment, the average pore diameter in the microsphere structure is approximately 12 nm.

In certain embodiments, the microspheres in the mesoporous metal oxide microsphere structure are comprised of nanocrystallites or nanograins having an average grain diameter between 1 nm and 20 nm. In another embodiment, the average grain diameter of the nanocrystallites is between 5 nm and 10 nm. In one particular embodiment, the average grain diameter is approximately 6 nm.

In certain embodiments, the mesoporous metal oxide microsphere structure has a surface area between 50 $m^2/g$ and 500 $m^2/g$. In another embodiment, the surface area is between 100 $m^2/g$ and 300 $m^2/g$. In another embodiment, the surface area of the mesoporous metal oxide microsphere structure is between 100 $m^2/g$ and 200 $m^2/g$.

The conductivity of the anode may be improved by coating at least a portion of the core composition anode surface with a carbon-containing composition. The anode may be coated with a non-metal or metalloid doped carbon composition. In certain embodiments, the anode is coated with a nitrogen-doped carbon composition. In one particular embodiment, the anode comprises lithium metal and a nitrogen-doped carbon coating composition. The source of the nitrogen doping element in the nitrogen-doped carbon coating composition may be by annealing cathodes in flowing ammonia or nitrogen gas or by coating organic amines. In particular, the source of the nitrogen doping element in the nitrogen-doped carbon coating composition may include pyridine, 1-ethyl-3-methylimidazolium bis (trifluoromethanesulfonyl) imide (EMIm-TFSI), 1-ethyl-3-methylimidazolium dicyanamide (EMIm-DCA), and mixtures thereof.

In certain embodiments, the coated anode comprises between 0.1-20 wt. % carbon, between 1-10 wt. % carbon, or between 4-8 wt. % carbon. Additionally, the coated anode may comprise between 0.01-10 wt. %, 0.05-5 wt. %, or 0.1-1 wt. % of the doping element (e.g., nitrogen).

Cathode Compositions Opposite a Nitride- and/or Oxide-Modified Anode:

If the modified electrode composition is used as the anode material in the battery, the cathode or counter-electrode may comprise a material capable of intercalating the metal ions during a discharge cycle and deintercalating the metal ions during a charge cycle. In certain embodiments, the cathode is a "high-rate" or "high current rate" cathode capable of a fast charge and discharge capacity.

In certain embodiments, the cathode comprises an active material selected from the group consisting of one or more phases: $LiCoO_2$, $LiMn_2O_4$, $Li_2MnO_3$, $LiNiO_2$, $Li(Mn_{1.5}Ni_{0.5})O_4$, $LiFePO_4$, $Li_2FePO_4F$, $Li_3CoNiMnO_6$, and $Li(Li_aNi_xMn_yCo_z)O_2$. In one particular embodiment, the cathode comprises $LiFePO_4$.

In other embodiments, the cathode is selected from the group consisting of: $\lambda$-$MnO_2$ (or $\lambda$-$Mn_2O_4$) and $V_2O_5$. In some embodiments, the cathode is "$LiM_xO_y$" [herein defined as any lithium-ion cathode material comprising a metal (M) and oxide (O)]. Non-limiting examples of $LiM_xO_y$ cathodes include lithium cobalt oxide, lithium iron phosphate, and lithium manganese oxide.

In certain embodiments, the cathode is $Li_aMn_{1.5-b}Ni_{0.5-c}M_dO_{4-x}$, wherein M comprises any metal element, including alkali metals, alkaline earth metals, transition metals, lanthanides, actinides, post-transition metals, or metalloids. In certain embodiments, "a" is between 0.5-2 or 1-1.4, "b" is between 0-0.5, "c" is between 0-0.5 or 0.-0.17, "d" is between 0-0.33, and "x" is 0 or 1. In some embodiments, the value of "1.5-b", "0.5-c," and "d" add up to a value between 1 or 2. In some embodiments, the metal element is added to the cathode material through a dopant compound. The dopant compound may be a metal oxide. In certain embodiments, the metal (M) in the cathode comprises an element selected from the group consisting of: Li, Na, K, Mg, Be, Ca, Sr, Ba, Si, Al, Ga, In, Tl, Sc, Ti, V, Cr, Fe, Pt, Os, Cu, or Zn.

In certain embodiments, these active components can be mixed with a carbon material (such as carbon black, for example) to make them conducting, and mixed with a binder (such as PVDF binder in N-methylpyrrolidinole, for example) to hold the material together.

In other non-limiting examples, Ti(II) and Mn(II) complexes may also be considered as a transition element for the cathode material.

In another embodiment, the cathode material is $\lambda$-$MnO_2$. In certain embodiments, the cathode material can be prepared in a "reduced" or uncharged state by reacting $MnO_2$ with butyllithium for Li-ion batteries. The cathode may then be "charged" by oxidation of the Mn oxide resulting in expulsion of $Li^+$ ions.

Spinel-type $MnO_2$ may be made by treating $LiMn_2O_4$ with aqueous acid. This $\lambda$-$MnO_2$ has the same structural framework of spinel, but with most of the lithium removed from the tetrahedral sites of the spinel lattice. The mechanism for the conversion of $LiMn_2O_4$ to $\lambda$-$MnO_2$ involves a disproportionation of the $Mn^{3+}$ ions into $Mn^{4+}$ (remains in the solid) and $Mn^{2+}$ (leaches out into the aqueous solution).

In some embodiments, the conductivity of the cathode composition may be improved by coating the surface of the cathode with a carbon-containing composition. The cathode may be coated with a non-metal or metalloid doped carbon composition. In some embodiments, the cathode is coated with a nitrogen-doped carbon composition. In one particular embodiment, the cathode comprises $LiFePO_4$ and a nitrogen-doped carbon coating composition. Non-limiting examples for the source of the nitrogen doping element in the nitrogen-doped carbon coating composition include pyridine, 1-ethyl-3-methylimidazolium bis (trifluoromethanesulfonyl) imide (EMIm-TFSI), 1-ethyl-3-methylimidazolium dicyanamide (EMIm-DCA), and mixtures thereof. In certain embodiments, the coated cathode comprises between 0.1-20 wt. carbon, between 1-10 wt. % carbon, or between 4-8 wt. % carbon. Additionally, the coated cathode may comprise between 0.01-10 wt. %, 0.05-5 wt. %, or 0.1-1 wt. % of the doping element (e.g., nitrogen, chromium).

In other embodiments, the cathode properties (e.g., conductivity, capacity retention) may be improved by chemically modifying the cathode through an annealing reaction. The annealing reaction may be conducted in a reducing atmosphere to at least partially reduce the metal in the cathode. For example, the reducing atmosphere may include a vacuum or flowing reducing gas to at least partially reduce the metal in the composition. In certain embodiments, the reducing atmosphere is an inert gas. In some embodiments, the reducing atmosphere is a vacuum. In other embodiments, the reducing atmosphere contains a gas selected from the group consisting of: hydrogen, argon, nitrogen, fluorine, sulfur, carbon monoxide, methane, ammonia, carbon dioxide, and mixtures thereof. In one particular embodiment, the annealing reaction is conducted in flowing ammonia gas (i.e., the cathode composition is subjected to a nitridation reaction). In some embodiments, the annealing reaction is carried out at a temperature between 300-800° C., 500-700° C., or 550° C. for a time between 30 minutes and 24 hours, or between 1-15 hours, with a reducing gas (e.g., ammonia) flow rate of approximately 1 mL/min-500 mL/min or about 200 mL/min for 0.5-2 g of cathode material.

In one particular embodiment, the cathode is a $LiMn_{1.5}Ni_{0.5}O_4$ or a doped metal cathode ($Li_aMn_{1.5-b}Ni_{0.5-c}M_dO_4$) (spinel), and is annealed in a flowing ammonia gas atmosphere. Such uniformly dispersed oxy-nitride, metal nitride, or dissolved/adsorbed nitrogen on active $Li_aMn_{1.5-b}Ni_{0.5-c}M_dO_4$ (spinel) cathode material can provide a high capacity retention, continuous chemical stability, tolerance of manganese dissolution at high temperature, improved electron conductivity, and/or reduced irreversible capacity loss. Controlled surface of the active material may have a low resistance and enhance the surface intercalation reaction of a lithium ion, reduce cell polarization, and/or inter-particle resistance and contact between active electrode material and electrolyte. Furthermore, an annealed spinel material may offer a viable, low-cost approach with a power density value much higher than that of the other cathode materials, such as $LiCoO_2$, $LiMn_2O_4$, and $LiFePO_4$. In certain embodiments, the annealed spinel cathodes may have a capacity exceeding 120 mAh/g or 130 mAh/g at various discharge rates, such as C/10, 1 C, 3 C, 5 C, and 10 C.

Electrolyte:

Suitable electrolytes for the battery are electrochemically stable compositions within the operation window of the electrodes. In other words, in certain embodiments, a suitable electrolyte is one that is capable of supporting reversible deposition and stripping of metal at the anode, and reversible intercalation and deintercalation of metal at the cathode. Suitable electrolytes may include materials that assist in achieving a wide electrochemical window, good ionic conductivity, improved rate capability, long cycle ability, good capacity retention, and compatibility with the anode and cathode materials.

In certain embodiments, the electrolyte is a metal salt. The metal salt may be dissolved in an organic solvent such as ethylene carbonate, dimethyl carbonate, diethyl carbonate, and combinations thereof. In some embodiments, the battery is a lithium-ion battery and the electrolyte is a lithium salt selected from the group consisting of: $LiPF_6$, $LiBF_4$, and $LiClO_4$. In one particular embodiment, the electrolyte is $LiPF_6$, dissolved in an organic solvent comprising a 1:1 weight ratio of ethylene carbonate and diethyl carbonate.

In certain embodiments, the electrolyte materials may be optimized through the addition of suitable co-solvents that may assist in reducing viscosity (increasing mobility) and/or increasing charge transfer number (increasing salt dissociation).

Performance:

In certain embodiments, the battery having nitride- and/or oxide-modified electrode has a higher capacity at high rates in comparison to a similar electrode that has not been modified (e.g., a nitride-modified metal fluoride electrode versus a pristine metal fluoride electrode composition).

The battery may have improved conductivity and thereby better capacity retention with high rate capability by the substitution of nitride or oxide for fluoride ions in a metal fluoride electrode. Nitride or oxide anions may exhibit greater covalent bonding than fluoride ions, resulting in improved electronic conductivity, which can enhance surface intercalation at higher voltages, and reduce cell polarization and interparticle resistance. Similarly, the nitride and/or oxide products formed during discharge may enhance ionic conductivity. Additionally, the nitride- and/or oxide-based coating or bulk modified doped electrode may overcome the barrier to high power performance while retaining high capacity and providing several advantages mentioned above.

In certain embodiments, the battery having a nitride- and/or oxide-modified electrode performs within at least 70%, 80%, 90%, or 95% of the theoretical capacity at C/10, 1 C, 10 C, or 60 C.

In other embodiments, the battery having a nitride- and/or oxide-modified electrode has a capacity (rate performance) of at least 700 mAh/g at a rate of C/10, a capacity of at least 300 mAh/g at a rate of 1 C, or a capacity of at least 100 mAh/g at a rate of 10 C.

In some embodiments, the battery having a nitride- and/or oxide-modified metal fluoride electrode is capable of achieving a peak power of at least 400 W/kg, 500 W/kg, 550 W/kg, 600 W/kg, or 625 W/kg. In one particular embodiment, the battery has a peak power of at least 625 W/kg, making the nitride- and/or oxide-modified electrode a highly competitive electrode material for vehicle battery and grid applications.

In certain embodiments, the battery is tested at a temperature of approximately 60° C. At this elevated temperature, the electrodes of the battery may have higher diffusion rates than at ambient temperature (i.e., approximately 20-25° C.). Additionally, at the elevated temperature, the battery may be capable of achieving a higher rate or higher capacity in comparison to the same battery composition at ambient temperature.

In certain embodiments, the battery is a secondary battery capable of having at least 100, 1000, 5000, or 10000 cycles prior to battery failure. In some embodiments, battery failure is related to the functional discharge capacity becoming only 50%, 60%, 70%, 80%, or 90% of the initial discharge capacity after a number of cycles. In other embodiments, battery failure is related to the inability to recharge the battery due to dendrite formation, oxide film formation, or other buildup on the anode or cathode. In one particular embodiment, the battery is capable of having a functional discharge capacity greater than 50% of the initial discharge capacity after 100, 1000, or 5000 cycles. In another embodiment, the secondary battery is capable of having a functional discharge capacity greater than 90% of the initial discharge capacity after 100, 1000, or 5000 cycles.

Methods of Making:

Methods of making the battery generally comprise providing a high rate capable anode and a high rate capable cathode, wherein the anode and/or cathode comprises a nitride- and/or oxide-modified electrode composition. In certain embodiments, the methods further comprise providing an electrolyte capable of supporting reversible deposition and stripping of metal at the anode, and reversible intercalation and deintercalation of the metal at the cathode.

Nitride- and/or oxide-modified bulk or surface compositions may be formed by beginning with doped $M_{1-z}M'_zF_{3-x}$ compositions, which are typically synthesized using traditional solid state reaction and co-precipitation methods, like those used to form undoped $MF_3$ compositions. For ternary mixed metal compounds $M_{1-z}M'_zF_{3-x}$, stoichiometric quantities of $MF_2$ or $MF_3$ are ground with $M'F_2$ or $M'F_3$, sealed under inert atmosphere, and heat-treated at 850° C. Binary metal fluoride powders with a mesoporous morphology may be prepared using solvothermal synthesis starting from metal nitrate precursors. For nitride-modified compositions, the binary and ternary metal fluorides are modified by annealing in flowing ammonia gas under optimized gas flow rates, temperature, and time. The resulting metal fluoride nitride $M_{1-z}M'_zF_{3-x}N_y$ is obtained as a bulk powder or as a coating on the $M_{1-z}M'_zF_{3-x}$ precursor powders.

The modified electrode may be formed as a bulk composition, wherein the nitride- and/or oxide-modified composition is present in both the core (and potentially the surface) of the electrode composition. As discussed above, the modified electrode may comprise a nitride- and/or oxide-modified metal fluoride composition having the following general formula: $M_{1-z}M'_zO_aF_{3-x}N_y$, wherein $0 \le z \le 1$, $-3 \le x < 0$ or $0 < x \le 3$, $0 \le a \le 1.5$, and $y > 0$. In other embodiments, the electrode comprises a nitride- and/or oxide-modified composition having the following general formula: $M_{1-z}M'_zO_aF_{3-x}N_y$, wherein $0 \le z \le 1$, $0 < x \le 3$, $0 \le a \le 1.5$, and $y > 0$.

The nitride- and/or oxide-modified active composition may be mixed with a carbon material (such as carbon black, for example) to make them conducting, and mixed with a binder (such as PVDF binder in N-methylpyrrolidinole, for example) to hold the material together. In some embodiments, the active nitride- or oxide-modified composition is mixed with carbon black (e.g., Super C45) and polyvinylidene fluoride (PVDF). In some embodiments, the weight ratio of active material (i.e., the nitride- or oxide-modified composition) to carbon black to PVDF is approximately 1:1:1, 2:1:1, 4:1:1, 6:1:1, 8:1:1, or 10:1:1.

The electrode composition may be formed in various structural patterns such as $ReO_3$-type structures (e.g., $M_{1-z}M'_zF_3$), nitride-doped rutile-type structures ($MF_2$), or bixbyite-type $M_4F_{3+y}N_{3-x}$, or mixtures thereof. The structural patterns may be varied based on the level of nitride doping and annealing conditions.

In other embodiments, the modified electrode is formed with a surface modification or coating, wherein the modification primarily exists on or near the surface of the electrode. In some embodiments, the modified electrode comprises a nitride- and/or oxide-modified metal fluoride composition having the following general formula: $M_{1-z}M'_zO_aF_{3-x}N_y$, wherein $0 \le z \le 1$, $-3 \le x < 0$ or $0 < x \le 3$, $0 \le a \le 1.5$, and $y > 0$. In other embodiments, the electrode comprises a nitride- and/or oxide-modified composition having the following general formula: $M_{1-z}M'_zO_aF_{3-x}N_y$, wherein $0 \le z \le 1$, $0 < x \le 3$, $0 \le a \le 1.5$, and $y > 0$.

In yet other embodiments, the modified electrode is a surface coating electrode composition, wherein a core electrode composition (e.g., a metal fluoride composition) is coated or covered with a conducting metal nitride or metal oxide composition. In certain embodiments, the surface coating may be prepared by physical vapor deposition of metal nitrides or metal oxides on the surface. In other embodiments, the surface coating composition could be deposited using a non-vacuum deposition technique such as chemical vapor deposition (CVD), sol-gel, e-beam, atomic layer deposition (ALD), or pulsed laser deposition (PLD). $NH_4F$ byproducts from the nitride-modification process may be removed through vacuum sublimation or washing in acidic solution before fabricating electrodes for electrochemical testing.

As discussed above, in certain embodiments, the modified electrode includes (1) a core composition $M_{1-z}M'_zF_3$, wherein $0 \le z \le 1$, and (2) a surface coating composition having a conducting metal nitride or metal oxide composition with the general formula: $M_{1-z}M'_zN_y$ or $M_{1-z}M'_zO_y$, wherein $0 \le z \le 1$ and $y > 0$. The core electrode composition may comprise an active metal fluoride component mixed with a carbon material (such as carbon black, for example) for added conductivity, and mixed with a binder (such as PVDF binder in N-methylpyrrolidinole, for example) to hold the material together. In some embodiments, the active composition is mixed with carbon black (e.g., Super C45) and polyvinylidene fluoride (PVDF). In some embodiments, the weight ratio of active material (i.e., the nitride- or oxide-modified composition) to carbon black to PVDF is approximately 1:1:1, 2:1:1, 4:1:1, 6:1:1, 8:1:1, or 10:1:1.

In certain embodiments, the nitride- and/or oxide-modified electrode is used as a cathode in a battery, wherein the anode comprises a lithium ion anode, sodium ion anode, carbon anode, or graphite anode. In other embodiments, the nitride- and/or oxide-modified electrode is used as an anode in a battery, wherein the cathode comprises an active material selected from the group consisting of one or more phases: $LiCoO_2$, $LiMn_2O_4$, $Li_2MnO_3$, $LiNiO_2$, $Li(Mn_{1.5}Ni_{0.5})O_4$, $LiFePO_4$, $Li_2FePO_4F$, $Li_3CoNiMnO_6$, and $Li(Li_aNi_xMn_yCo_z)O_2$. In some embodiments, the electrolyte in the battery is a typical lithium electrolyte such as 1 M $LiPF_6$ in ethylene carbonate (EC)/diethyl carbonate (DEC) (1/1) solution.

In some embodiments, batteries for grid storage applications may be formed. In other embodiments, batteries for vehicle applications may be formed. In yet other embodiments, batteries for military applications may be formed. In yet other embodiments, batteries for portable electronic devices may be formed. In some embodiments, batteries for medical device applications may be formed. In certain embodiments, batteries for standard cell size battery applications may be formed.

While the invention as described may have modifications and alternative forms, various embodiments thereof have been described in detail. It should be understood, however, that the description herein of these various embodiments is not intended to limit the invention, but on the contrary, the intention is to cover all modifications, equivalents, and alternatives falling within the spirit and scope of the invention as defined by the claims. Further, while the invention will also be described with reference to the following non-limiting examples, it will be understood, of course, that the invention is not limited thereto since modifications may be made by those skilled in the art, particularly in light of the foregoing teachings.

Material Characterization and Electrochemical Evaluation:

In certain embodiments, the bulk and surface coating powders for the electrodes are examined for structure and phase purity using X-ray diffraction (XRD). Patterns may consist of either nitride-doped $ReO_3$-type structures ($M_{1-z}M'_zF_3$), nitride-doped rutile-type structures ($MF_2$), or bixbyite-type $M_4F_{3+y}N_{3-x}$, or mixtures of these structure types, depending upon the level of nitride doping and annealing conditions.

High resolution XPS spectra for metal ions (M, M'), F, and N for pristine and nitride-modified $M_{1-z}M'_zF_{3-x}N_y$ electrode materials may be used to verify the composition and electronic structure. Furthermore, nitrogen sorption isotherms may be used to examine porosity and surface area of powders.

X-ray diffraction (XRD) patterns may be collected on a Bruker D5005 diffractometer using Cu Kα radiation. Rietveld refinement of XRD pattern is performed using the General Structure Analysis System (GSAS) software. Thermogravimetry-Differential Scanning calorimetry (TG-DSC) may be conducted in a temperature range of 25-1000° C. and in an argon flow atmosphere with a Netzsch STA 409 PC thermal analyzer. The particle size distribution may be measured using a Malvern Mastersizer 2000 particle size analyzer. Nitrogen adsorption-desorption isotherms may be obtained using a TriStar surface area & porosity analyzer at 77 K. The specific surface area may be calculated by the Brunauer-Emmett-Teller (BET) method.

The cycling performance of pristine and nitride- and/or oxide-modified $M_{1-z}M'_zF_{3-x}N_y$ may be examined for capacity retention at different cycling rates. It is expected that nitride- and/or oxide-modified samples will show higher capacity retention than pristine metal fluorides at high rates. The rate capability of cathode materials may be an important issue in judging their potential for high power applications.

Electrochemical measurements may be conducted by assembly of 2032 coin-type cell with a lithium metal anode or counter-electrode. The battery cell may be assembled in an argon-filled glove box, cell performance evaluated between 3.5 and 5.0 V at room temperature, and electrochemical cycling measurements conducted at different discharge capacity (C)-rates.

With specific reference to the embodiments and examples shown in the drawing figures, FIGS. 1(A)-(C) depict structures for nitride-based modification of ternary $M_{1-z}M'_zF_3$ and FIGS. 2(A)-(C) depict nitride- and oxide-based modification techniques for $M_{1-z}M'_zO_aF_{3-x}$ electrodes.

Figure 3:
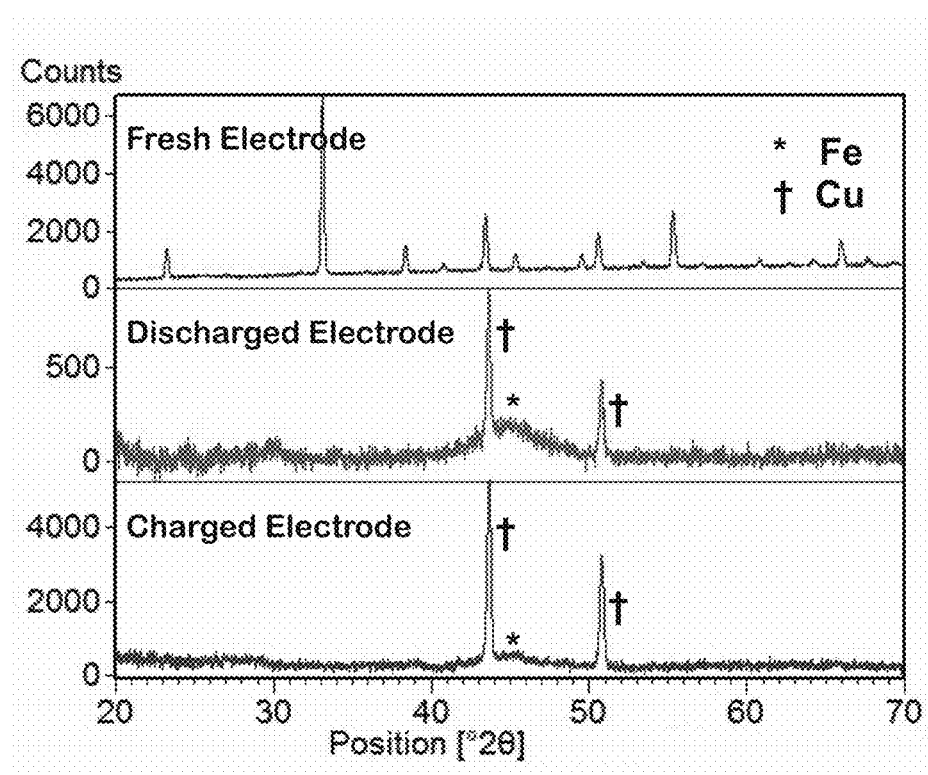
FIG. 3 depicts x-ray diffraction data for a bixbyite-type $Fe_2O_{3-x}F_yN_z$ electrode in the fresh, discharged, and charged states.

X-ray diffraction data are shown in FIG. 3 for a bixbyite-type $Fe_2O_{3-x}F_yN_z$ electrode in the fresh, discharged and charged states. The fluorine and nitrogen are found mainly on the surface. The oxide electrode is not crystalline after cycling. Nanocrystalline $Fe_{(s)}$ product from the conversion reaction is observed in the discharged data, with a small fraction remaining after charging.

Figure 4:
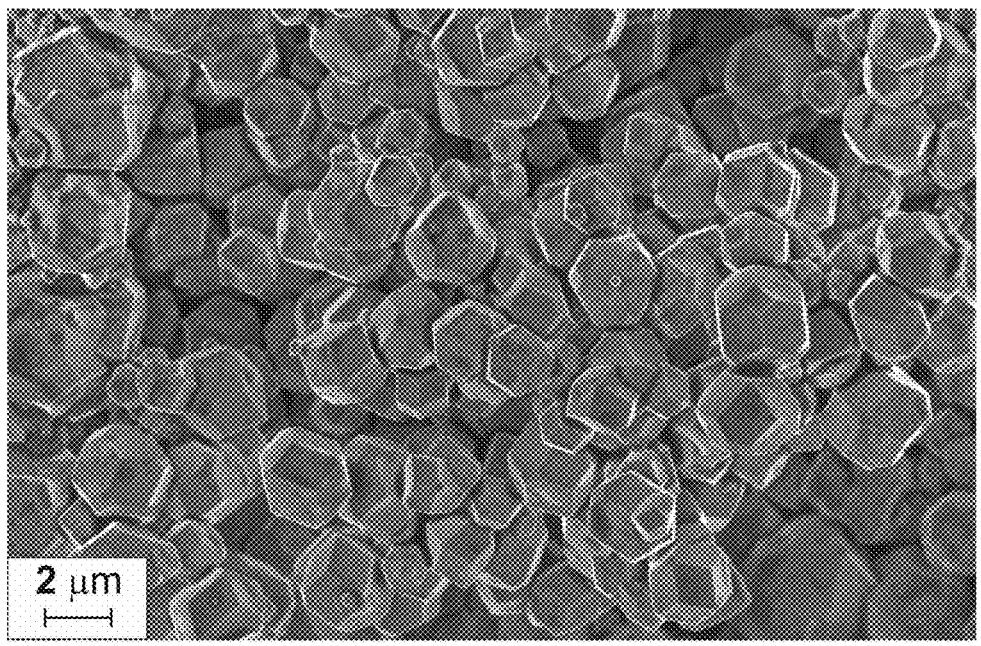
FIG. 4 depicts scanning electron microscopy (SEM) data for a bixbyite-type $Fe_2O_{3-x}F_yN_z$ electrode powder.

The scanning electron microscopy (SEM) data for the bixbyite-type $Fe_2O_{3-x}F_yN_z$ electrode powder are shown in FIG. 4. The β-$Fe_2O_{3-x}F_yN_z$ powder contains faceted rhombic dodecahedral crystals, generally in the micron size range.

Figure 5A:
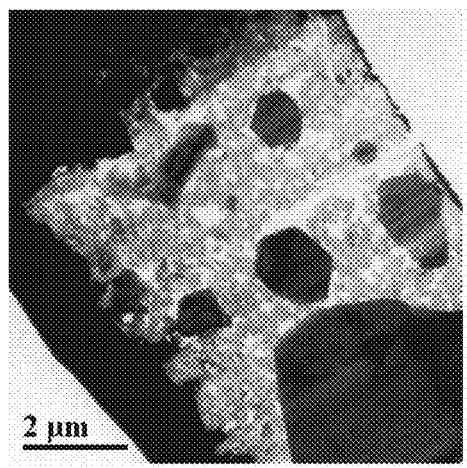
FIG. 5A depicts an image from the scanning tunneling electron microscopy (STEM) for a $Fe_2O_{3-x}F_yN_z$ starting fresh electrode.
Figure 5B:
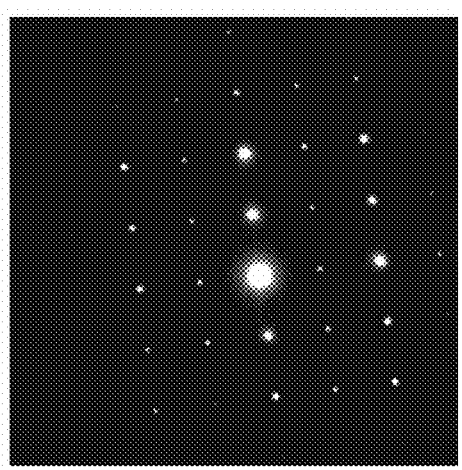
FIG. 5B depicts an electron diffraction image indicating a cubic unit cell.
Figure 5C:
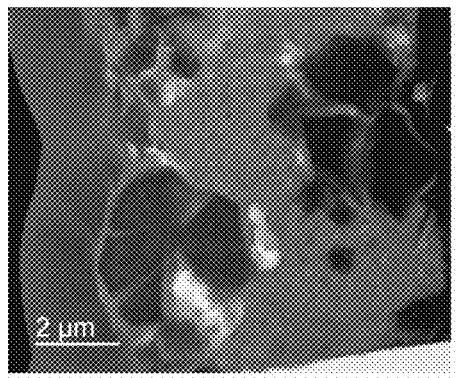
FIGS. 5C-5F depict STEM data for a cycled, charged electrode.
Figure 5D:
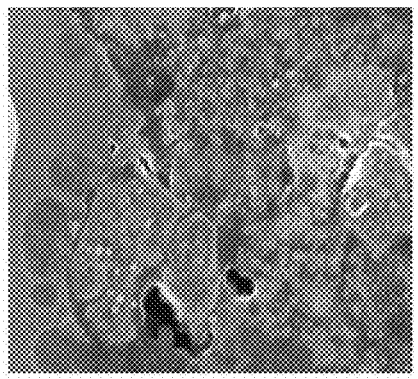
Figure 5E:
Figure 5F:
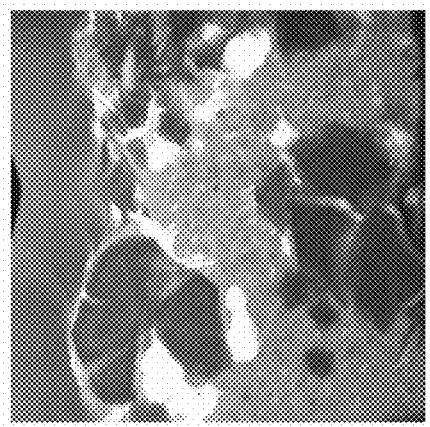

An image from scanning tunneling electron microscopy (STEM) for the $Fe_2O_{3-x}F_yN_z$ starting fresh electrode is shown in FIG. 5A, and a corresponding electron diffraction image indicating the cubic unit cell is shown in FIG. 5B. The STEM data for a cycled, charged electrode are shown in FIG. 5 (C-F), where the images are bright field transmission electron microscopy (BF TEM; FIG. 5C), scanning electron microscopy (SEM; FIG. 5D), high angle annular dark field scanning transmission electron microscopy (HAADF STEM; FIG. 5E), and bright field scanning transmission electron microscopy (BF STEM; FIG. 5F). The images show the composite nature of the electrode, with a mixture of binder, conducting carbon powder, and $Fe_2O_{3-x}F_yN_z$. It is clear from the image that significant changes in the morphology of the $Fe_2O_{3-x}F_yN_z$ particles has occurred as a result of cycling, which are now less symmetrical.

Figures 6A, 6B:
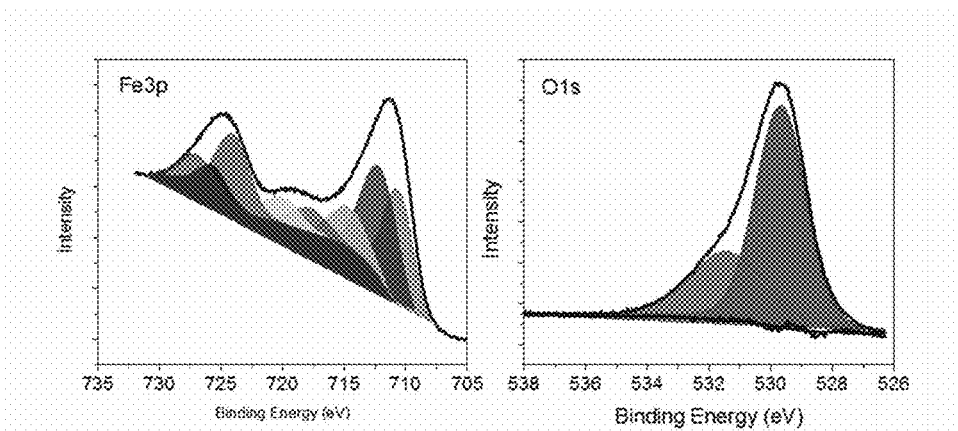
FIGS. 6A-6D depict x-ray photoelectron spectroscopy (XPS) data for $\beta\text{-}Fe_2O_{3-x}F_yN_z$ powder.
Figures 6C, 6D:
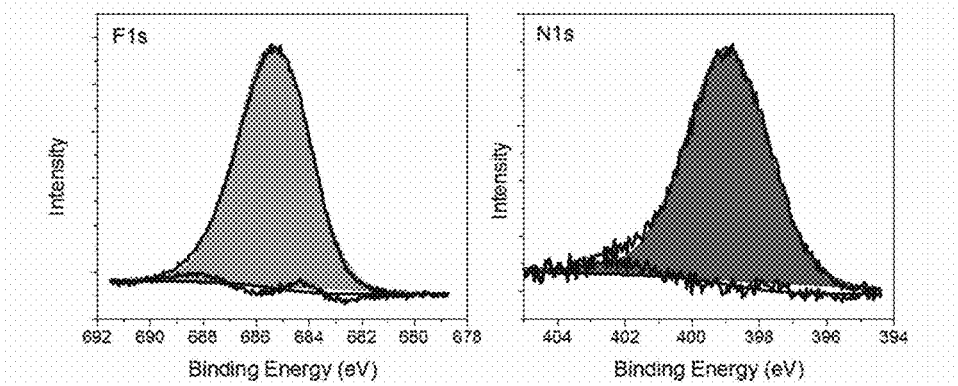

FIG. 6 shows the x-ray photoelectron spectroscopy (XPS) data for β-$Fe_2O_{3-x}F_yN_z$ powder. This method is most sensitive to the surface region of a sample. The shaded regions under the curves indicate analysis of the electronic states of the elements listed. The analysis is used here to show that the presence of F and N on the surface is clearly demonstrated.

Figure 7A:
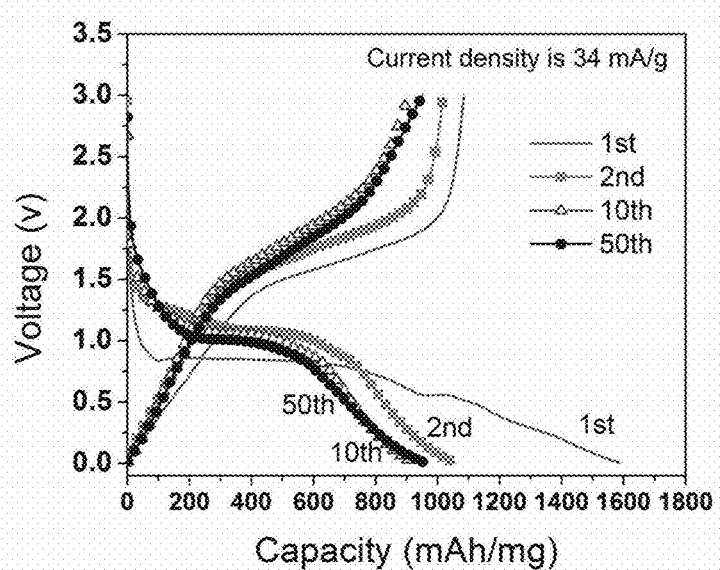
FIG. 7A depicts the electrochemical profile the a a bixbyite-type $Fe_2O_{3-x}F_yN_z$ electrode.
Figure 7B:
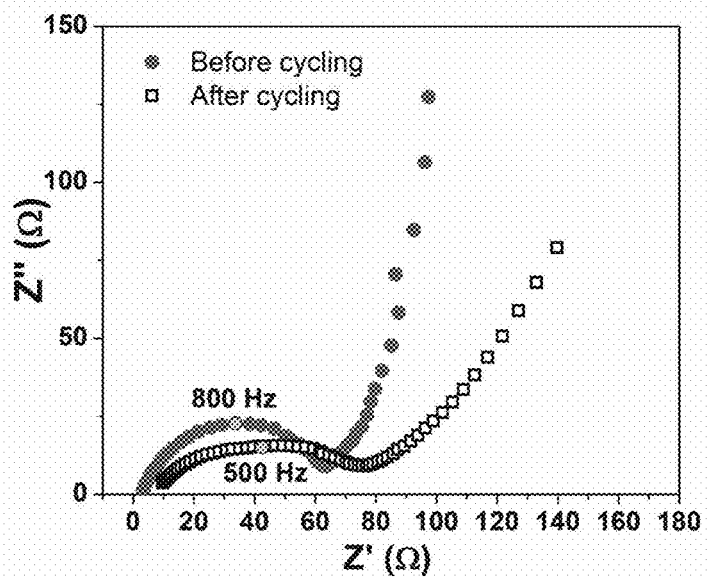
FIG. 7B depicts impedance data showing an increase in resistance associated with the solid-electrolyte interphase (SEI) formation.

The electrochemical profile for the bixbyite-type $Fe_2O_{3-x}F_yN_z$ electrode is given in FIG. 7A. After SEI formation in initial cycles, a voltage plateau near to 1.2V is observed, as expected for $Fe_2O_{3-x}F_yN_z$. In FIG. 7B, impedance data show there is an increase in resistance associated with the SEI formation in the first cycle, as expected when cycling to low voltages in carbonate electrolyte.

Figure 8A:
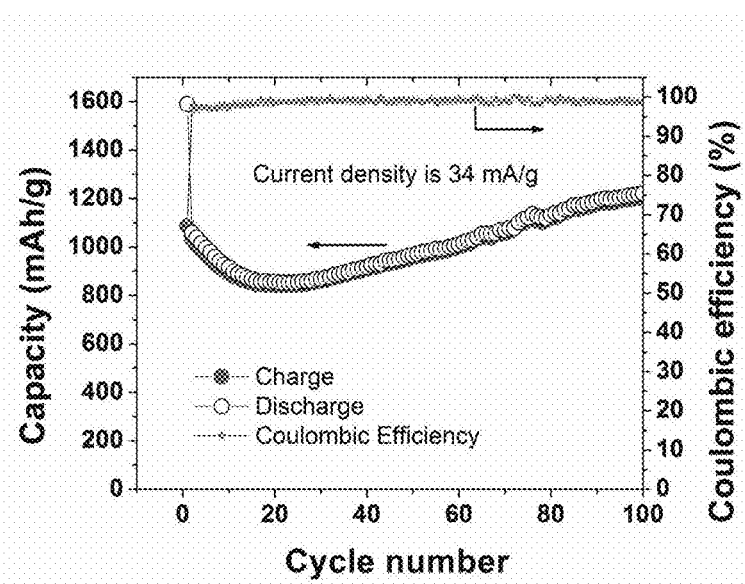
FIG. 8A depicts data showing that the $\beta\text{-}Fe_2O_{3-x}F_yN_z$ electrodes display a decreasing capacity in the initial cycles, followed by a gradual increase in capacity over subsequent cycles.
Figure 8B:
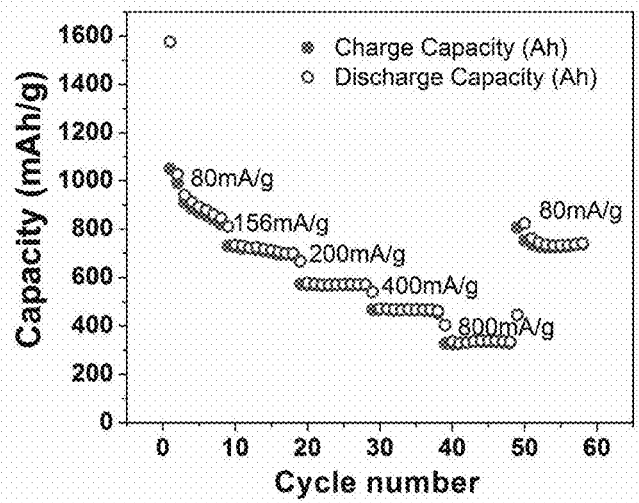
FIG. 8B depicts data from the testing of rate performance of an electrode.

The β-$Fe_2O_{3-x}F_yN_z$ electrodes display a decreasing capacity in the initial cycles, followed by a gradual increase in capacity over many subsequent cycles, as indicated in FIG. 8A. A high capacity is maintained up to a rate of 1 C in the testing of rate performance in FIG. 8B.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" or "an" is intended to include "at least one" or "one or more." For example, "an electrode" is intended to include "at least one electrode" or "one or more electrodes."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. An electrode for a battery comprising:
a nitride- or oxide-modified composition having the following formula:

$$M_{1-z}M'_zO_aF_{3-x}N_y,$$

wherein:
0<z<1;
−3≤x<0 or 0<x≤3;
0≤a≤1.5;
y>0;
M is selected from the group consisting of: Ti, V, Cr, Mn, Fe, Co, Ni, Cu, and Bi; and
M' is selected from the group consisting of: Na, Mg, Al, P, K, Ca, Sc, Cr, Fe, Cu, Zn, Ga, As, Rb, Sr, Y, Zr, Nb, Mo, Tc, Ru, Rh, Pd, Ag, Cd, In, Sb, Te, Cs, Ba, Hf, Ta, W, Re, Os, Ir, Pt, Au, Tl, Pb, and Bi.

2. The electrode of claim 1, wherein a>0 and x=3.

3. The electrode of claim 1, wherein the composition has a structure selected from the group consisting of: a $ReO_3$-type structure, a rutile-type structure, a bixbyite-type structure, or a combination thereof.

4. The electrode of claim 1, wherein the composition is a bulk composition or a surface coating composition.

5. The electrode of claim 4, wherein the electrode further comprises a metal fluoride core composition.

6. The electrode of claim 1, wherein the composition is used as a cathode in a lithium-ion battery further comprising an anode and an electrolyte, wherein the battery has at least one of the following performance characteristics:
(a) a capacity at least 700 mAh/g at a rate of C/10, a capacity of at least 300 mAh/g at a rate of 1 C, or a capacity of at least 100 mAh/g at a rate of 10 C; and
(b) a functional discharge capacity of at least 50%, 60%, 70%, 80%, or 90% of the initial discharge capacity after 100 cycles.

7. An electrode for a battery comprising:
a surface coating composition comprising the nitride- or oxide-modified composition of claim 1;
a core composition having the formula $$M_{1-z}M'_zO_aF_{3-x},$$

wherein:
0≤a≤1.5;
0≤z≤1;
−3≤x<0 or 0<x≤3;
M is selected from the group consisting of: Ti, V, Cr, Mn, Fe, Co, Ni, Cu, and Bi; and
M' is selected from the group consisting of: Na, Mg, Al, Si, P, K, Ca, Sc, Ti, V, Cr, Mn, Fe, Co, Ni, Cu, Zn, Ga, Ge, As, Rb, Sr, Y, Zr, Nb, Mo, Tc, Ru, Rh, Pd, Ag, Cd, In, Sb, Te, Cs, Ba, Hf, Ta, W, Re, Os, Ir, Pt, Au, Tl, Pb, and Bi.

8. A battery comprising:
an anode;
a cathode;
an electrolyte capable of supporting reversible deposition and stripping of metal at the anode, and reversible intercalation and deintercalation of the metal at the cathode;
wherein either the anode or the cathode comprises a nitride- or oxide-modified composition,
wherein the nitride- or oxide-modified composition has the following formula, $$M_{1-z}M'_zO_aF_{3-x}N_y,$$

wherein:
0<z<1;
−3≤x<0 or 0<x≤3;
0≤a≤1.5;
y>0;
M is selected from the group consisting of: Ti, V, Cr, Mn, Fe, Co, Ni, Cu, and Bi; and
M' is selected from the group consisting of: Na, Mg, Al, P, K, Ca, Sc, Cr, Fe, Cu, Zn, Ga, As, Rb, Sr, Y, Zr, Nb, Mo, Tc, Ru, Rh, Pd, Ag, Cd, In, Sb, Te, Cs, Ba, Hf, Ta, W, Re, Os, Ir, Pt, Au, Tl, Pb, and Bi.

9. The battery of claim 8, wherein a>0 and x=3.

10. The battery of claim 8, wherein the nitride- or oxide-modified composition comprises a surface coating composition and a core composition,
wherein the surface coating composition comprises the nitride- or oxide-modified composition of claim 8, and the core composition is $M_{1-z}M'_zO_aF_{3-x}$, wherein:
0≤a≤1.5;
0≤z≤1;
−3≤x<0 or 0<x≤3;
M is selected from the group consisting of: Ti, V, Cr, Mn, Fe, Co, Ni, Cu, and Bi; and
M' is selected from the group consisting of: Na, Mg, Al, Si, P, K, Ca, Sc, Ti, V, Cr, Mn, Fe, Co, Ni, Cu, Zn, Ga, Ge, As, Rb, Sr, Y, Zr, Nb, Mo, Tc, Ru, Rh, Pd, Ag, Cd, In, Sn, Sb, Te, Cs, Ba, Hf, Ta, W, Re, Os, Ir, Pt, Au, Tl, Pb, and Bi.

11. The battery of claim 8, wherein the anode comprises the nitride- or oxide-modified metal composition and the cathode comprises an active material selected from the group consisting of one or more phases: $LiCoO_2$, $LiMn_2O_4$, $Li_2MnO_3$, $LiNiO_2$, $Li(Mn_{1.5}Ni_{05})O_4$, $LiFePO_4$, $Li_2FePO_4F$, $Li_3CoNiMnO_6$, and $Li(Li_aNi_xMn_yCo_z)O_2$, or wherein the cathode comprises the nitride- or oxide-modified composition and the anode comprises an active material selected from the group consisting of: lithium ion, sodium ion, carbon, and graphite.

12. The battery of claim 8, wherein the battery is selected from the group consisting of the following battery types: lithium-ion, aluminum-ion, magnesium-ion, sodium-ion, metal-air, and metal-sulfur, wherein the metal is lithium, aluminum, magnesium, zinc, or sodium.

13. The battery of claim 8 having at a capacity at least 700 mAh/g at a rate of C/10, a capacity of at least 300 mAh/g at a rate of 1 C, or a capacity of at least 100 mAh/g at a rate of 10 C, and having a functional discharge capacity of at least 90% of the initial discharge capacity after 100 cycles.

14. An electrode for a battery comprising:
a nitride- or oxide-modified composition having the following formula:

$$M_{1-z}M'_zO_aF_{3-x}N_y,$$

wherein:
0<z<1;
−3≤x<0 or 0<x≤3;
0≤a≤1.5;
y>0;
M is selected from the group consisting of: Cr, Fe, Cu, and Bi; and
M' is selected from the group consisting of: Na, Mg, Al, Si, P, K, Ca, Sc, Ti, V, Cr, Mn, Fe, Co, Ni, Cu, Zn, Ga, Ge, As, Rb, Sr, Y, Zr, Nb, Mo, Tc, Ru, Rh, Pd, Ag, Cd, In, Sn, Sb, Te, Cs, Ba, Hf, Ta, W, Re, Os, Ir, Pt, Au, Tl, Pb, and Bi.

15. The electrode of claim 14, wherein a>0 and x=3.

16. A battery comprising:

an anode;

a cathode;

an electrolyte capable of supporting reversible deposition and stripping of metal at the anode, and reversible intercalation and deintercalation of the metal at the cathode;

wherein either the anode or the cathode comprises a nitride- or oxide-modified composition of claim 14.

17. An electrode for a battery comprising:

a nitride- or oxide-modified composition having a formula selected from: $V_{1-z}Mn_zO_aF_{3-x}N_y$, $V_{1-z}Ti_zO_aF_{3-x}N_y$, $V_{1-z}Co_zO_aF_{3-x}N_y$, $V_{1-z}Ni_zO_aF_{3-x}N_y$, $V_{1-z}Si_zO_aF_{3-x}N_y$, $V_{1-z}Sn_zO_aF_{3-x}N_y$, $V_{1-z}Ge_zO_aF_{3-x}N_y$, $Cr_{1-z}Si_zO_aF_{3-x}N_y$, $Cr_{1-z}Sn_zO_aF_{3-x}N_y$, $Cr_{1-z}Ge_zO_aF_{3-x}N_y$, $Fe_{1-z}Si_zO_aF_{3-x}N_y$, $Fe_{1-z}Sn_zO_aF_{3-x}N_y$, $Fe_{1-z}Ge_zO_aF_{3-x}N_y$, $Cu_{1-z}Si_zO_aF_{3-x}N_y$, $Cu_{1-z}Sn_zO_aF_{3-x}N_y$, $Cu_{1-z}Ge_zO_aF_{3-x}N_y$, $Bi_{1-z}Si_zO_aF_{3-x}N_y$, $Bi_{1-z}Sn_zO_aF_{3-x}N_y$, $Bi_{1-z}Ge_zO_aF_{3-x}N_y$, $Ti_{1-z}Mn_zO_aF_{3-x}N_y$, $Ti_{1-z}Co_zO_aF_{3-x}N_y$, $Ti_{1-z}Ni_zO_aF_{3-x}N_y$, $Ti_{1-z}V_zO_aF_{3-x}N_y$, $Mn_{1-z}Ti_zO_aF_{3-x}N_y$, $Mn_{1-z}Co_zO_aF_{3-x}N_y$, $Mn_{1-z}Ni_zO_aF_{3-x}N_y$, $Mn_{1-z}V_zO_aF_{3-x}N_y$, $Co_{1-z}Ti_zO_aF_{3-x}N_y$, $Co_{1-z}Mn_zO_aF_{3-x}N_y$, $Co_{1-z}Ni_zO_aF_{3-x}N_y$, $Co_{1-z}V_zO_aF_{3-x}N_y$, $Ni_{1-z}Ti_zO_aF_{3-x}N_y$, $Ni_{1-z}Co_zO_aF_{3-x}N_y$, $Ni_{1-z}Mn_zO_aF_{3-x}N_y$, and $Ni_{1-z}V_zO_aF_{3-x}N_y$, wherein:

$0<z<1$;

$-3 \le x<0$ or $0<x \le 3$;

$0 \le a \le 1.5$; and $y>0$.

18. A battery comprising:

an anode;

a cathode;

an electrolyte capable of supporting reversible deposition and stripping of metal at the anode, and reversible intercalation and deintercalation of the metal at the cathode;

wherein either the anode or the cathode comprises a nitride- or oxide-modified composition of claim 17.

* * * * *

UNITED STATES PATENT AND TRADEMARK OFFICE
CERTIFICATE OF CORRECTION

PATENT NO. : 10,044,038 B2
APPLICATION NO. : 14/473099
DATED : August 7, 2018
INVENTOR(S) : Bridges et al.

Page 1 of 1

It is certified that error appears in the above-identified patent and that said Letters Patent is hereby corrected as shown below:

In the Claims

In Column 15, Claim 7, Line 53, insert --Sn,-- between "In," and "Sb,".

Signed and Sealed this
Ninth Day of October, 2018

Andrei Iancu
*Director of the United States Patent and Trademark Office*